United States Patent [19]

Mein et al.

[11] 4,299,735

[45] Nov. 10, 1981

[54] HEAVY METAL-MANGANESE OXIDATION CATALYSTS AND PROCESS OF PRODUCING SAME

[75] Inventors: Peter G. Mein; Arno H. Reidies, both of LaSalle, Ill.

[73] Assignee: Carus Corporation, LaSalle, Ill.

[21] Appl. No.: 137,920

[22] Filed: Apr. 7, 1980

Related U.S. Application Data

[63] Continuation-in-part of Ser. No. 59,439, Jul. 20, 1979, abandoned.

[51] Int. Cl.³ .................. B01J 21/04; B01J 23/34; B01J 23/72; B01J 23/84
[52] U.S. Cl. .................. 252/465; 252/463; 252/466 J; 252/467; 252/471
[58] Field of Search .................. 252/463, 465, 466 J, 252/467, 471; 423/245 S, 599

[56] References Cited

U.S. PATENT DOCUMENTS

| | | | |
|---|---|---|---|
| 1,971,168 | 8/1934 | Weiss | 423/599 |
| 1,995,353 | 3/1935 | Jenness | 252/471 X |
| 3,049,399 | 8/1962 | Gamson et al. | 423/599 X |
| 3,700,605 | 10/1972 | Dodman et al. | 252/471 |

*Primary Examiner*—W. J. Shine

[57] ABSTRACT

Alkali metal delta manganese dioxide hydrate, which is obtained as a by-product in the industrial oxidation of organics by $KMnO_4$ is subjected to ion exchange reaction with heavy metal ions (copper, iron, silver, etc.). The reaction is carried out on the acid side of the pH at which a hydroxide precipitate of the heavy metal will not form, and continued until the reaction product contains less than 0.5 moles of bound alkali metal per mole of manganese. The product is recovered and prepared for catalytic use in the form of dried porous pellets. The resulting oxidation catalysts have high efficiency, long life, and optimum activity at reasonable temperatures. These catalysts can be used for applications such as the oxidation and deodorization of exhaust gases from paint drying ovens.

22 Claims, No Drawings

HEAVY METAL-MANGANESE OXIDATION CATALYSTS AND PROCESS OF PRODUCING SAME

CROSS-REFERENCE

This application is a continuation-in-part of co-pending application Ser. No. 59,439, filed July 20, 1979, now abandoned.

BACKGROUND AND PRIOR ART

Oxidation catalysts containing manganese and a polyvalent metal, such as copper, cobalt, or silver, have been in commercial use for many years. They are referred to as "Hopcalites". The Hopcalite catalyst containing copper with manganese has been commonly used in gas masks for oxidation of carbon monoxide. Hopcalites may be formed by the coprecipitation of $Mn(OH)_2$ with $Cu(OH)_2$ or other polyvalent metal hydroxide. (See, for example, U.S. Pat. No. 1,345,323 of 1920.) Manganese catalysts containing copper or other polyvalent metal have also been prepared from a solution of the metal salt and potassium permanganate in the presence of hydrogen peroxide. U.S. Pat. No. 1,971,168 (1934), and U.S. Pat. No. 1,995,353 (1935). The resulting catalyst is described as an acid manganite of the copper or other polyvalent metal, such as, for example, $Cu(HMnO_3)_2$. As far as is known, such acid manganite catalysts have not found commercial applications.

Dodman et al in U.S. Pat. No. 3,700,605 (1972) describe a procedure for preparing a manganese catalyst by first forming a manganese oxide precipitate from potassium permanganate in the presence of alkali metal hydroxide. The recovered precipitate is resuspended in water, and an aqueous solution of a salt of a polyvalent metal is introduced into the suspension to react therewith. The patent recommends the use of cobalt, copper, silver or lead ions to replace the alkali metal in the precipitate. This ion exchange reaction is described as being carried out at ambient temperature (e.g. 20° C.). No pH adjustment is disclosed. Dodman et al propose that an inert insoluble substance (e.g. kieselguhr or silica) should be suspended in the potassium permanganate solution as it is converted to the manganese dioxide precipitate, thereby providing a catalyst support. The catalyst is used for reduction reactions, such as the reduction of nitrocompounds with carbon monoxide.

Dodman et al did not propose the use of "by-product" manganese dioxide as a starting material for catalyst preparation. However, the by-product manganese dioxide resulting from the use of potassium permanganate to oxidize organic substances under alkaline conditions is similar to the manganese dioxide precipitate prepared by Dodman et al. Chemically, they are both alkali metal delta manganese dioxide hydrate.

In the procedure of Dodman et al, the alkali metal manganese dioxide precipitate (the delta manganese dioxide hydrate) is suspended in water, and the aqueous solution of the heavy metal salt is gradually introduced into the suspension. The ion exchange reaction therefore starts at a high alkaline pH, and most if not all of the reaction takes place under alkaline pH conditions. During the course of the experimental work leading to the present invention, it was discovered that the Dodman et al reaction procedure is undesirable. At start of the reaction, under Dodman's pH conditions part of the heavy metal ions form hydroxide precipitates, which reduce the reaction rate, require more reagent, and, if not redissolved or extracted become associated with the catalyst product.

SUMMARY OF INVENTION

In the improved process for producing a heavy metal-manganese oxidation catalyst, a suspension is formed of finely-divided alkali metal delta manganese dioxide hydrate in an aqueous solution containing the heavy metal ions. At the start of the reaction, the suspension has an initial pH of at least one-half pH point below the pH at which the heavy metal hydroxide begins to precipitate. The reaction is then carried out while maintaining pH control; namely, so that the pH of the reaction mixture is maintained on the acid side of the hydroxide precipitation pH. Preferably, the reaction is continued until the manganese reaction product contains not over 0.05 moles of bound alkali metal per mole of manganese. The reaction product is then separated, and dried porous catalytic pellets are prepared therefrom. In a preferred procedure, a paste is prepared from the reaction product in hydrated form and water-containing bentonite. The paste is extruded to form pellets, and the pellets are dried to a porous non-agglomerating condition.

DETAILED DESCRIPTION

The starting material for practicing the present invention can be generically described as alkali metal delta manganese dioxide hydrate. The alkali metal content of the manganese dioxide may be potassium, sodium, or other alkali metal, but will usually comprise both sodium and potassium. When the manganese dioxide is produced by the oxidation of an organic substance under conditions where the alkalinity is provided by sodium hydroxide, the resulting manganese dioxide will contain both sodium and potassium. Such by-product $MnO_2$ may contain from 0.55 to 0.65 moles of total alkali metal per mole of Mn, about 0.5 moles of which are bound alkali which cannot be washed out with water. A representative analysis of such by-product $MnO_2$ is: 47.5% $MnO_2$, 2.8% $K_2O$, 8.6% $Na_2O$, 41% $H_2O$ (the sodium and potassium being expressed as oxides).

Although the use of by-product $MnO_2$ is preferred, if desired, potassium permanganate ($KMnO_4$) can be converted into alkali metal delta manganese dioxide. If other alkali metal ions (viz. lithium ions) are present during the reduction of the potassium permanganate to manganese dioxide, the resulting product will also contain them.

By-product manganese dioxide is a fine particulate solid, the particles having an average size of less than 5 microns in diameter. These particles can readily be suspended in an aqueous reaction solution, and maintain in suspension by low energy mixing. For the purpose of the present invention, it is therefore convenient to suspend the manganese dioxide in an aqueous solution containing the heavy metal ions to be reacted with the manganese dioxide for replacement of the alkali metal by an ion exchange-type reaction. However, alkali metal delta manganese dioxide hydrate is strongly alkaline, giving a pH in the range of 11–14 when suspended in water. As indicated above, it has been found that such alkaline pH conditions are undesirable for the replacement reaction. At alkaline pH's the reaction cannot be carried to completion. Further, it is desirable to avoid the formation of hydroxide precipitates.

The heavy metals which are particularly desirable for use in practicing the present invention include: copper, chromium, iron, lead, nickel, cobalt, and silver. With reference to these metals, their initial hydroxide precipitation pH's vary from a pH as low as 5.0 for copper and chromium ions to a pH as high as 8.0 for silver ions. In general, the initial pH of the reaction mixture should be at least one-half pH point below the pH at which the heavy metal hydroxide begins to precipitate. Such desirable starting pH conditions are set out below in Table A, where the indicated upper limits for the reaction pH are approximately one-half pH unit below the pH at which the heavy metal hydroxide begins to precipitate, that is, the initial hydroxide precipitation pH as shown in the table. As a further guide to practicing the present invention, the preferred initial reaction pH is set out for each of the metals. Where possible, the reaction is preferably conducted at a pH of 5.0 or above, providing the other stated pH conditions can be satisfied. As the pH of the reacting solution is decreased such as at low acid pH's in the range of 1 to 3, the hydrogen ion will compete with the heavy metal ions for replacement of the alkali metal, and the resulting product will therefore contain less of the heavy metal. Therefore, it is preferred to employ an acid pH of at least 4.0, and where possible, at least 5.0. It will therefore be understood that the preferred initial reaction pH's in Table A have been set out with this consideration in mind. A further consideration is that preferably the initial reaction pH is about one pH point below the hydroxide precipitation pH.

Avoiding the hydroxide precipitation inherent in the process of Dodman et al (U.S. Pat. No. 3,700,605) is particularly advantageous for metals like copper when the hydroxide precipitate is difficult to redissolve. Other metals of this class include iron, lead and chromium. Better results can be obtained by the procedure of Dodman et al for metals like cobalt where the hydroxide redissolves at a neutral or slightly acid pH.

TABLE A

| Heavy Metal | Hydroxide | Initial Hydroxide Precipitation pH | Upper Limit on pH | Preferred Initial Reaction pH |
|---|---|---|---|---|
| copper | $Cu(OH)_2$ | 5.0 | 4.5 | 4.0 |
| chromium | $Cr(OH)_3$ | 5.0 | 4.5 | 4.0 |
| iron | $Fe(OH)_2$ | 5.8 | 5.3 | 4.0–4.8 |
| lead | $Pb(OH)_2$ | 7.2 | 6.7 | 5.0–6.2 |
| nickel | $Ni(OH)_2$ | 7.4 | 6.9 | 5.0–6.4 |
| cobalt | $Co(OH)_2$ | 7.5 | 7.0 | 5.0–6.5 |
| silver | $AgOH$ | 8.0 | 7.5 | 5.0–7.0 |

Even though the salts of heavy metals, such as the nitrate salts, form acid solutions in water, it will usually be necessary to add acid to prevent the alkaline manganese dioxide from causing the suspension pH to rise to a level at which heavy metal hydroxide forms. The pH control by acid addition preferably uses the same acid as the heavy metal salt anion (nitric acid for nitric salts, sulfuric acid for sulfates, etc.), thereby avoiding introducing other anions, but other acids can be used.

The desired ion exchange reaction takes place readily at room temperature (20°–25° C.). Therefore, it is not necessary to heat the reaction mixture in order to promote the reaction, although heating can be used to minimize the reaction time. The general reaction temperature range is from 15° to 75° C., and preferred reaction temperatures are from 20° to 35° C. As can be seen, therefore, with reference to the heavy metals used in the process of the present invention, reaction temperature is not a critical variable.

It is desirable to use sufficient solution so that the particles of manganese dioxide are easily maintained in suspension. For example, from 2.5 to 3.5 parts of the solution can be used per part by weight of the by-product $MnO_2$. The reacting solution preferably should contain an excess of the heavy metal ions over that required for complete replacement of the alkali metal. For example, the reacting solution may contain from 0.55 to 0.75 monovalent metal, or from 0.3 to 0.5 moles of divalent metal, or from 0.2 to 0.35 moles of trivalent metal per mole of manganese.

The heavy metals are used in the form of their salts. For example, nitrate salts give excellent results. Other soluble salts may be used. It is desirable to avoid salt anions which may adversely affect the catalysts. For example, the presence of chloride ions is believed to be less desirable for this reason. From the standpoint of the desired reaction, the only requirement is that the solution contain the heavy metal ions.

For the purpose of the present invention, the exchange reaction is preferably continued until the reaction product contains not over 0.05 moles of bound alkali metal per mole of manganese. The term "bound" alkali metal refers to the alkali metal remaining after the reaction product has been thoroughly washed with water. Such washing will remove the free alkali metal ions liberated by the reaction. For optimized catalytic activity, the reaction product should contain not over 0.030 moles of bound alkali metal per mole of manganese. The heavy metal content of the product on completion of the replacement reaction can be about 0.5 moles of monovalent metal, or 0.25 to 0.33 moles of divalent metal, or 0.15 to 0.2 moles of trivalent metal per mole of manganese. As produced and prior to drying, the heavy metals are believed to be in hydroxide form, and the heavy metal manganese oxide complex is also associated with water of hydration.

After the suspension has been formed as described above and the replacement reaction is under way, the pH of the suspension tends to decrease as the reaction proceeds. Therefore, during the course of the reaction, it is usually not necessary to add additional acid to maintain the pH below the hydroxide precipitation pH. Further, as the reaction proceeds, the pH can be permitted to drop. Final pH's on completion of the reaction of as low as 2.5 to 3.5 do not appear to interfere with the completion of the reaction. In general, the pH of the suspension on completion of the reaction will approach the pH of the heavy metal salt when dissolved in water (without manganese dioxide). (However, silver nitrate has a pH in water of about 6.5 to 7.0, while the pH during reaction drops to about 2.5.) Summarizing, after the initial adjustment of the pH, the reaction will proceed under acidic pH conditions, the pH gradually dropping during the reaction, and without the need for the addition of further pH adjusting agents.

On completion of the reaction, the particles of the reaction product are separated from the reaction solution. Next the recovered material is thoroughly washed with water to remove any free alkali metal. It is then ready for further processing. If the product is washed on the filter, the washed filter cake is ready for preparing the catalyst in pellet form.

The product is preferably prepared in the form of dried porous catalytic pellets. To accomplish this, the washed reaction product can be mixed with a suitable binder and pelletized. It has been found that binders which are capable of absorbing water are particularly desirable. For example, the binder may be water-containing bentonite. More specifically, the reaction product in hydrated form is mixed with water and bentonite to provide a paste which is extruded to form pellets. The paste may contain from 0.5 to 1.5 parts by weight of bentonite per part of manganese (Mn) in the reaction product. For example, on an equal parts basis (1 pt. bentonite per part Mn), the paste will contain about 30% to 35% by weight of bentonite on a dry basis. In preparing the paste water is added to give a total water content of about 35-45% by weight. The paste is mixed and kneaded until it is homogenous. The pellets produced in this manner may be of any shape, but cylindrical pellets can be easily formed by extrusion and are advantageous. Such pellets may conveniently have a diameter of about 0.3 to 0.7 cm, and a length of 1.25 to 2.5 cm. From the cylindrical ribbons in which the paste is extruded, pellets can be formed of any desirable length.

The pellets are then dried to a porous non-agglomerating condition. The drying is preferably carried out in such a way as to avoid severe shrinkage or breakage of the pellets. For example, the extruded pellets are preferably dried slowly at a temperature of from 50° to 60° C. in a moving airstream of moderate flow rate from 8 to 10 hours. This gradual drying will cause the free water to slowly evolve, creating highly porous pellets without disrupting the pellet structure. After the initial drying, most of the water will have been removed. For example, if the extruded pellets contain 40% total water by weight, on completion of the initial drying, they may contain only about 10% water (as bound water). The final drying may be conveniently carried out at the time the catalyst is activated for use. This will further increase the porosity of the pellets. For example, the pellets may be heated at a temperature of 70° to 100° C. in a high velocity airstream for 5 to 10 minutes to remove the bound water. This will then complete the activation of the catalyst. The initial drying can be combined with the final drying and activation by heating the pellets in a moving airstream for 1 to 4 hours at a temperature of 150°–160° C. The procedure described will produce catalytic pellets of maximized, microscopic voids, which are desirable for optimizing catalytic activity.

The process of this invention if further illustrated by the following specific examples.

EXAMPLE I

Forty-one to sixty-eight grams of $CuSO_4.5\ H_2O$ is dissolved in 232 to 259 ml of water. To this solution 100 grams of by-product $MnO_2$ (typically consisting of 47.46% $MnO_2$, 2.75% $K_2O$, 8.58% $Na_2O$ and 41.2% $H_2O$) is gradually added with stirring whereby the pH is maintained by the simultaneous addition of sulfuric within the range of 4.0 to 4.5. Agitation is continued for 1–2 hours at a temperature between ambient and 35° C. The solids are separated by filtration and the cake is washed with water until all of the soluble constituents are removed. The filter cake—after sucking is as dry as possible—represents a damp mass, having the following typical composition: 44.3% $MnO_2$, 10.1% CuO, 0.48% $K_2O$, 0.08% $Na_2O$, and 44 to 45% $H_2O$. The copper manganate (IV) in this material can be characterized by the formula: $CuO.4\ MnO_2.x\ H_2O$.

EXAMPLES II–VII

For producing catalysts from nickel, cobalt, and silver as described in Example I, the corresponding amounts of the salts of these metals are set out below:

| Example | Heavy Metal Salt | Aqueous Solution Concentration |
|---|---|---|
| II | $Cr(NO_3)_3 \cdot 9H_2O$ | 44 to 76 grams per 224 to 256 ml $H_2O$ |
| III | $FeSO_4 \cdot 7H_2O$ | 46 to 76 grams per 224 to 254 ml $H_2O$ |
| IV | $Pb(NO_3)_2$ | 54 to 90 grams per 210 to 246 ml $H_2O$ |
| V | $Ni(NO_3)_2 \cdot 6H_2O$ | 48 to 80 grams per 220 to 252 ml $H_2O$ |
| VI | $Co(NO_3)_2 \cdot 6H_2O$ | 48 to 80 grams per 220 to 252 ml $H_2O$ |
| VII | $Ag(No_3)$ | 51 to 70 grams per 230 to 249 ml $H_2O$ |

EXAMPLE VIII

The products produced by the foregoing Examples I to VII can be pelletized as follows:

The reaction product is mixed with one pound bentonite per pound manganese. Water is added to provide a total content of 40%. The mixture is kneaded until a homogeneous paste is obtained. The paste is then extruded to form pellets.

The extruded pellets are dried at a temperature of from 50° to 60° C. in a moving airstream of moderate flow rate from 2 to 10 hours. The gradual drying will result in the removal of the free water. After the initial drying, most of the water will have been removed. For example, if the pellets as extruded contained 40% total water by weight, on completion of the initial drying they can still contain between 8 and 12% water, as bound water. The final drying may be conveniently carried out at the time the catalyst is activated for use. In this activation step, the catalyst is quickly heated above 100° C. in a high velocity airstream for 5 to 10 minutes to remove the bound water. Alternatively, the initial drying and the activation of the extruded pellets can be combined by removing both the free and bound water by heating between 150° and 160° C. for from 1 to 4 hours in a moving airstream. In this procedure, the extruded pellets are preferably loosely packed. It has been found that during the drying it is advantageous to have an airstream passing over the product (as opposed to stable air). Catalyst product dried in static air shows lower activity.

EXAMPLE IX

As an alternative to the procedure of Example VIII and based on present information, the best mode of pelletizing the rare earth-manganese oxidation catalysts is to utilize hydrated alumina [AlO(OH)] instead of bentonite. Any form of hydrated alumina suitable for use as a catalyst carrier can be employed, such as the commercial product, alpha alumina, which is the alpha form of hydrated alumina. More specifically, the catalytic pellets can be prepared from a paste comprising a mixture of the hydrated reaction product, such as the products produced by Examples I to VII and partially peptized hydrated alumina. The paste mixture is dried to remove water.

Hydrated alumina is a known catalyst support material and is available commercially. For example, Catapal SB alpha alumina can be employed as supplied by Conoco Chemicals Division, Continental Oil Company, Houston, Texas. This hydrated alpha alumina product typically contains 74–75% by weight $Al_2O_3$, and has boehmite crystal structure, which can be converted to gamma alumina by calcining for three hours at 900° F. Such alumina may be formed into pellets by various procedures involving partial peptization, wherein there is a partial reconversion of the solid alumina to a gel state. One procedure involves the addition of a peptizing acid, such as nitric acid, but other procedures can be used.

The hydrated alumina may be combined with the catalytic reaction product in amounts ranging from 0.25 to 2 parts of $Al_2O_3$ per part of manganese. For example, 1 part of Catapal SB alumina (74–75% $Al_2O_3$) per part of contained Mn is combined with any of the reaction products of Examples I to VII. This corresponds approximately to a $Al_2O_3$ content of the mixture of 25–30% by weight on a dry basis. The water content of the resulting paste may range from about 35 to 45% by weight, the reaction product thereby being in hydrated form.

The paste prepared as described can be peptized by kneading or mulling for one to two hours. This results in partial peptization of the hydrated alumina, sufficient alumina gel being formed to act as a binder. Care should be taken not to overpeptize the material by excessive mulling times or by the addition of too much acid, if acid is employed to shorten the peptization time. For example, 12 to 13 grams of $HNO_3$ (100%) can be added per pound of Catapal SB, and the required partial peptization completed by mulling for five to fifteen minutes. Further details of the procedure are included in the following illustrative embodiment.

The damp catalytic reaction product (viz. from Examples I to VII) is mixed with one lb of Catapal SB per lb of contained manganese. Twelve grams of $HNO_3$ (100%) diluted with water is added per lb of the alumina. The total water added is such that the overall moisture content of the mixture amounts to 40–45%. After kneading for 5–15 minutes, the homogeneous paste is extruded to form pellets. The damp pellets are first dried for 10–20 hours at 100° C. in a low to moderate velocity airstream. This will remove most of the "free" water and leave about 8–12% as "bound" water. In the final preparation step, the catalyst is calcined for 3 hours at 480° C. in a dynamic airstream. The pelleted product is now essentially anhydrous and ready for use.

As compared with the pelleted product of Example VIII, catalytic pellets prepared as described in this example provide certain advantages. Catalytic pellets are resistant to liquid water, and do not soften or disintegrate. Further, the crush strength is improved. Catalytic activity is also greater due to higher surface area and greater pour volume. The product has increased tolerance to high temperatures up to about 535° C. Also, it appears that the product is somewhat less susceptible to sulfur poisoning, and that the useable ratios to catalyst paste to binder permits the pelleted product to contain lower percentages of active material without loss of efficiency.

We claim:

1. The process of producing a heavy metal-manganese dioxide oxidation catalyst comprising the steps of:
(a) forming a suspension of finely-divided alkali metal delta manganese dioxide hydrate in an aqueous solution containing heavy metal ions selected from the class consisting of copper, chromium, iron, lead, nickel, cobalt, silver, and mixtures thereof, said suspension having an initial pH of at least one-half pH point below the pH at which the heavy metal hydroxide begins to precipitate;
(b) exchanging the alkali of said alkali metal manganese dioxide hydrate with said heavy metal ions under pH conditions on the acid side of said hydroxide precipitation pH and continuing said exchanging reaction until the manganese reaction product contains not over 0.05 moles of bound alkali metal per mole of manganese, said heavy metal ions exchanged for said alkali metal being complexed with the manganese dioxide of the resulting reaction product;
(c) separating said reaction product from said aqueous solution; and
(d) preparing dried porous catalytic pellets from said reaction product.

2. The process of claim 1 in which said manganese dioxide is by-product manganese dioxide containing sodium and potassium.

3. The process of claim 1 or claim 2 in which said heavy metal ions are copper ions.

4. The process of claim 1 in which said heavy metal ions are lead ions.

5. The process of claim 1 or claim 2 in which said heavy metal ions are iron ions.

6. The process of claim 1 or claim 2 in which said heavy metal ions are chromium ions.

7. The process of claim 1 in which said reaction is continued until said reaction product contains not over 0.03 moles of alkali metal per mole of manganese, and in which said heavy metal ions are selected from the group consisting of copper, lead, iron, and silver.

8. The process of claim 1 in which said catalytic pellets are prepared from a paste comprising a mixture of said reaction product in hydrated form and water-containing bentonite, said paste being extruded to form pellets, and said pellets being dried to a porous nonagglomerating condition.

9. The process of claim 1 in which said catalytic pellets are prepared from a paste comprising a mixture of said reaction product in hydrated form and a partially peptized hydrated alumina catalyst carrier, said pellets being dried to remove water therefrom.

10. The process of producing a heavy metal-manganese dioxide oxidation catalyst, consisting essentially of the steps of:
(a) introducing finely-divided alkali metal delta manganese dioxide hydrate into an aqueous solution of heavy metal ions to form a reaction suspension, said heavy metal ions being selected from the class consisting of copper, iron, lead, nickel, cobalt, chromium, and mixtures thereof, said suspension having an initial pH of at least one-half pH point below the pH at which the heavy metal hydroxide begins to precipitate;
(b) exchanging the alkali metal of said alkali metal manganese dioxide hydrate in said suspension with said heavy metal ions under pH conditions on the acid side of said hydroxide precipitation pH and continuing said exchanging reaction until the reaction product contains not over 0.03 moles of total bound potassium and sodium per mole of manganese, said heavy metal ions exchanged for said alkali metal being complexed with the manganese dioxide of the resulting reaction product;
(c) separating said reaction product from said aqueous solution; and
(d) preparing dried porous catalytic pellets from said reaction product by forming a paste from a mixture of said reaction product with water and a binder, extruding said paste to form pellets, and drying said pellets to remove water therefrom.

11. The catalytic pellets produced by the process of claim 10.

12. The process of claim 10 in which said heavy metal ions are copper ions.

13. The process of claim 10 in which said heavy metal ions are lead ions.

14. The process of claim 10 in which said heavy metal ions are chromium ions.

15. The process of claim 10 in which said heavy metal ions are iron ions.

16. The process of claim 1 or claim 10 in which said reaction is carried out at a pH of about 4.0 or higher.

17. The process of claim 10 in which said catalytic pellets are prepared from a mixture of said reaction product in hydrated form and a partially peptized hydrated alumina carrier, said pellets after extrusion being dried to remove water.

18. The catalytic pellets produced by the process of claim 17.

19. The catalytic pellets of claim 11 in which said heavy metal ions are copper ions.

20. The catalytic pellets of claim 11 in which said heavy metal ions are lead ions.

21. The catalytic pellets of claim 11 in which said heavy metal ions are chromium ions.

22. The catalytic pellets of claim 11 in which said heavy metal ions are iron ions.

* * * * *